United States Patent [19]

Heinrich et al.

[11] Patent Number: 4,517,506

[45] Date of Patent: May 14, 1985

[54] WRENCH PROVIDED WITH AN ALTERNATING CURRENT DRIVE MOTOR

[75] Inventors: Wulf-Dieter Heinrich, Wolfsburg; Henning Otte, Parsau, both of Fed. Rep. of Germany

[73] Assignee: Robert Bosch GmbH, Stuttgart, Fed. Rep. of Germany

[21] Appl. No.: 403,621

[22] PCT Filed: Dec. 18, 1981

[86] PCT No.: PCT/DE81/00230

§ 371 Date: Jul. 23, 1982

§ 102(e) Date: Jul. 23, 1982

[87] PCT Pub. No.: WO82/02297

PCT Pub. Date: Jul. 8, 1982

[30] Foreign Application Priority Data

Dec. 27, 1980 [DE] Fed. Rep. of Germany ....... 3049200

[51] Int. Cl.³ ............ H02P 5/34

[52] U.S. Cl. ............ 318/807; 318/432

[58] Field of Search ............ 318/807, 432, 433, 434; 81/467, 469

[56] References Cited

U.S. PATENT DOCUMENTS

| | | | |
|---|---|---|---|
| 1,723,528 | 8/1929 | Schneider | 318/778 |
| 1,810,227 | 6/1931 | Shea | 318/807 |
| 1,970,179 | 8/1934 | Miller | 318/434 |
| 3,892,146 | 7/1975 | Yasoshima | 81/469 |
| 4,041,361 | 8/1977 | Cornell | 318/432 |

FOREIGN PATENT DOCUMENTS

| | | | |
|---|---|---|---|
| 2726818 | 12/1977 | Fed. Rep. of Germany | 318/432 |
| 197801 | 1/1978 | U.S.S.R. | 318/807 |

*Primary Examiner*—B. Dobeck
*Assistant Examiner*—Bentsu Ro
*Attorney, Agent, or Firm*—Michael J. Striker

[57] ABSTRACT

The invention relates to a wrench provided with an alternating current drive motor whose peculiarity is a medium frequency asynchronous motor (2) which is used as the drive motor with an associated device (7) for a frequency switching from the medium frequency to a lower line frequency. The mentioned device (7) is connected with a cycle control (8) from which it is switched off as soon as it receives the signal by means of a connected torque sensor (5) about the occurence of the setting moment on the screw joint made with the wrench.

3 Claims, 2 Drawing Figures

WRENCH PROVIDED WITH AN ALTERNATING CURRENT DRIVE MOTOR

BACKGROUND OF THE INVENTION

The present invention relates to a wrench provided with an alternating current drive motor.

The state of the art encompasses pneumatic wrenches (air wrenches) which have a series of disadvantages. They require an expensive preparation of the air, relatively complicated devices for a constant maintaining of pressure and for an exact switching, and offer only a relatively lower torque in the rapid motion range.

Furthermore, wrenches are in use with alternating current drive motors, which are designed as single frequency asynchronous motors. These drive motors operate with at least two stage gears which, after the occurrence of a predetermined starting moment, switches over to a lower output speed of the wrench. Such wrenches are not useable for highly exact screwed joints since the exact stopping of the drive motor is difficult after reaching the predetermined starting moment at the higher rotation of speed of the motor. Furthermore, the energy required by such wrenches is relatively high.

SUMMARY OF THE INVENTION

It is therefore an object of the invention to provide a wrench which is provided with an alternating current drive motor which permits to maintain an exact predetermined starting moment and which has a lower energy requirement with respect to the described state of the art.

These and other objects of the invention are attained by a drive of a wrench, comprising an asynchronous drive motor; a torque sensor; cycle control means, said torque sensor being connected to the wrench and to said cycle control means; a medium frequency line; a lower frequency line; and contactor means connected to said drive motor and to said cycle control means, said contactor means switching said motor from the medium frequency line to the lower frequency line, said torque sensor supplying signals to said cycle control means so that said contactor means is actuated by said cycle control means in dependence upon the signals from said torque sensor during the occurrence of the setting moment on the wrench, wherein the drive motor is used which has a rotor sweep frequency which is about the same as the lower line frequency.

With the inventive wrench, the drive motor is operated with a high speed until reaching the setting moment, thereafter a lowering of the speed of the drive motor occurs to such a lower value by switching over from a medium frequency, for example, 200 Hz to 50 Hz, so that after reaching the starting moment the exact stopping of the motor and thereby the total wrench is considerably facilitated. Additionally, the possibility exists to electrically slow down the drive motor by means of a three phase terminal short circuit.

Advantageous embodiments of the invention are the subject matter of the subclaims.

If, in accordance with FIG. 1, a drive motor with a rotor sweep frequency is used which is at least about the same as the lower line frequency, the sweep point, i.e., the operating point of the maximum torque when operating with the lower line frequency, for example, 50 Hz is displaced to the proximity of the starting point of the drive motor, so that the drive motor supplies an increasing torque during the tightening of the screw with a decreasing speed until stopping. Simultaneously, the copper losses of the drive motor are considerably reduced with respect to an operation with only a nominal frequency, i.e., a medium frequency.

The periodically reproducible maximum torque during the tightening of the screw is practically limited by the effective value of the motor current, averaged by means of an operational cycle. If greater torques are required, the frequency switching can be supplemented by switching a gear drive in the wrench.

DETAILED DESCRIPTION OF THE PREFERRED EMBODIMENTS

Figure 1:
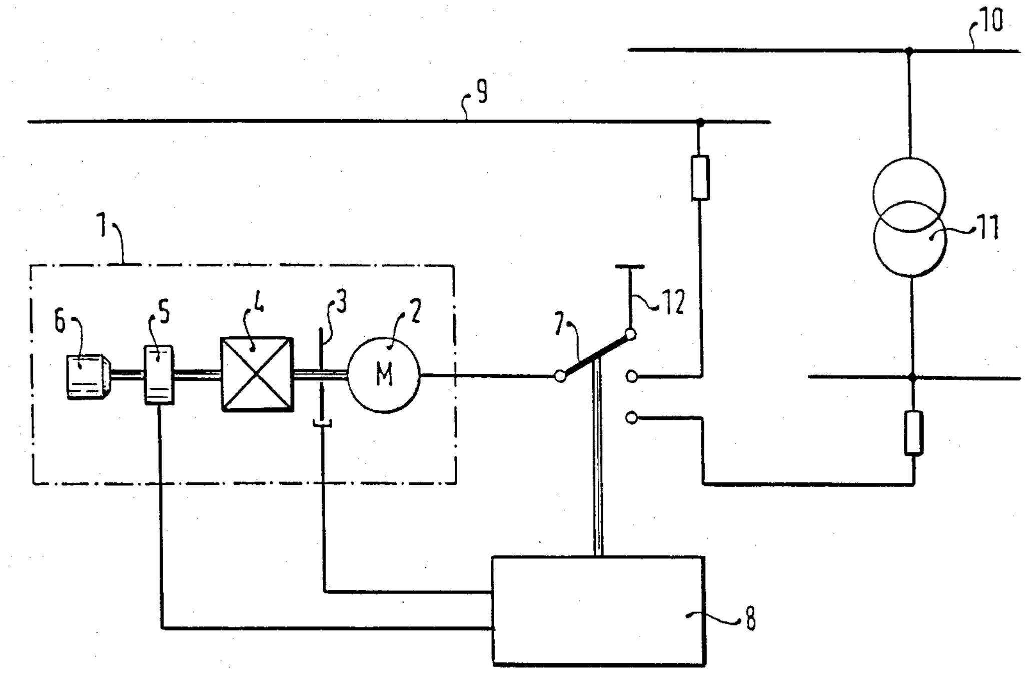
FIG. 1 is a diagrammatic view of the circuit.

If one at first looks at FIG. 1, it can be seen that at 1 the wrench is schematically indicated, which is provided with the three phase brushless asynchronous medium frequency motor 2, the rotating angle sensor 3, the single stage reducing drive 4, the torque sensor 5 and wrench 6. By means of a device for the frequency switching which in this case is formed by a contactor 7, the drive motor 2 is connected, in dependency from orders of the cycle control 8, to the medium frequency line 9 (200 Hz, 135 V) or to the lower frequency line 10 (380 V, 50 Hz), whereby the connection to the latter line is performed through transformer 11 which transforms the voltage down to 60 V. In the illustrated position of the contactor 7 the drive motor 2 is additionally slowed down by the three phase terminal short circuit 12.

Figure 2:
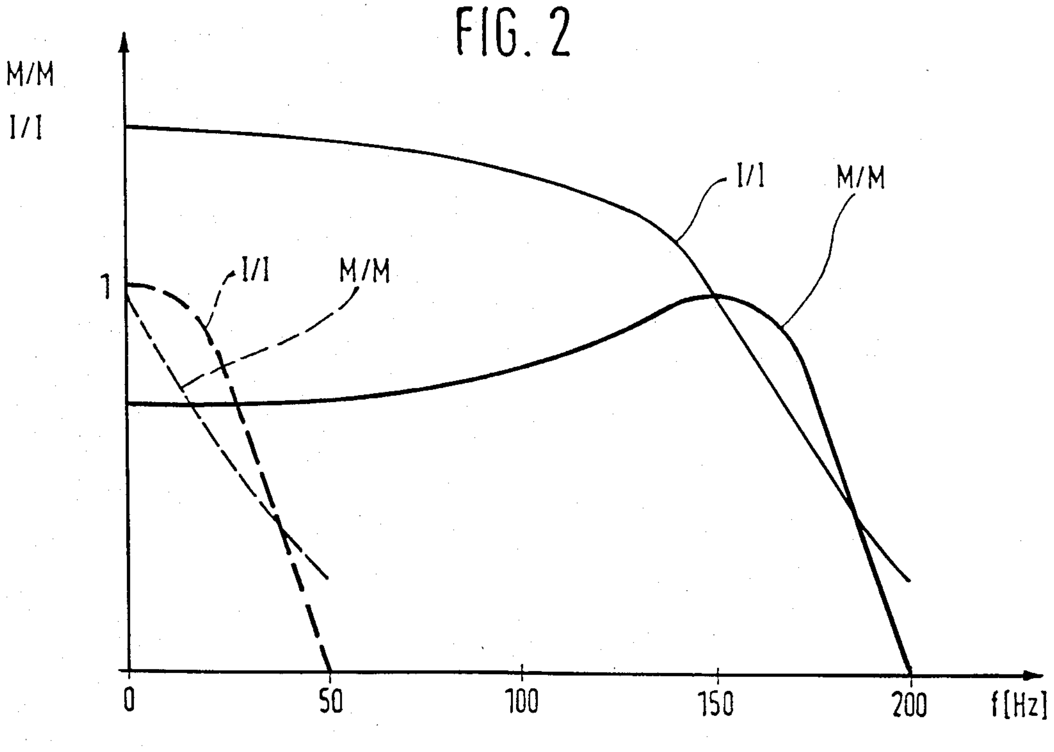
FIG. 2 are the curves of the normalized torque and the normalized motor current when fed with medium frequency or lower line frequency.

The contactor 7 switches the drive motor 2 to the medium frequency line 9 until reaching the setting moment on wrench 6, so that the wrench operates with a high speed. In accordance with the diagram in FIG. 2 which illustrates the normalized torque $$\frac{M}{M_{sweep}}$$

and the normalized current $$\frac{I}{I_{sweep}}$$

of the drive motor above frequency f, a commercially available medium frequency drive motor is used whose frequency rotor sweep moment $M_{sweep}$ is at about 3/4 of the nominal frequency of the drive motor.

In dependency of the rotating angle-and torque signals fed to the cycle control 8 it supplies a switching order to contactor 7 during the occurence of the setting moment, whereby the contactor may also be replaced by a capacity semi-conductor, so that the contactor 7 connects the drive motor 2 with the output of transformer 11. Thereby, a frequency reduction of the feeding voltage occurs from 200 Hz to 50 Hz as well as a reduction of the value of the feeding voltage from 135 V to 60 V. Due to the selected drive motor, the rotation sweep point is now applied in the proximity of the starting point, so that, as shown in the curve in FIG. 2, accentuated by crosses, the wrench delivers an increasing torque with a decreasing speed up to stopping during the tightening of the screw. Since the operation with 50 Hz is only for a short time, the transformer 11 has to be designed only for a short time operation.

As already mentioned, drive 4 is a stageless gear, so that switch over processes are avoided behind the drive motor 2 in direction of the power flow.

The frequency should be so chosen that available mains can be used.

We claim:

1. In a drive of a wrench for tightening screws, a combination comprising an asynchronous drive motor; a torque sensor; cycle control means, said torque sensor being connected to said cycle control means; a medium frequency line; a lower frequency line; and contactor means connected to said drive motor and to said cycle control means, said contactor means being operative for selectively switching said motor to the medium frequency line or from the medium frequency line to the lower frequency line, said drive motor having a rotor sweep frequency which is about the same as the lower line frequency, said torque sensor being operatively connected to said drive motor and immediately connected to the wrench, said torque sensor being operative for supplying signals to said cycle control means so that said contactor means is actuated by said control means to switch said motor from the medium frequency line to the lower frequency line in response to the signals from said torque sensor when a setting moment on a screw being tightened by the wrench occurs.

2. The drive in accordance with claim 1, wherein the drive motor is operated with its nominal voltage during the medium frequency operation, and wherein a voltage switching is coupled with the frequency switching for a feeding voltage for drive motor which is about proportional to the frequency change.

3. The drive in accordance with claim 2, further including a speed reducing single stage drive interconnected between said motor and said wrench.

* * * * *